United States Patent [19]
Horska

[11] Patent Number: 5,542,020
[45] Date of Patent: Jul. 30, 1996

[54] FIBER OPTIC CABLE HAVING EXTENDED CONTRACTION WINDOW AND ASSOCIATED METHOD AND APPARATUS FOR FABRICATING THE CABLE

[75] Inventor: Jana Horska, Catawba County, N.C.

[73] Assignee: CommScope, Inc., Catawba, N.C.

[21] Appl. No.: 258,532

[22] Filed: Jun. 10, 1994

[51] Int. Cl.⁶ .................................. G02B 6/44
[52] U.S. Cl. ................. 385/112; 385/100; 385/109; 385/110; 385/111; 385/113
[58] Field of Search ................. 385/100, 109, 385/110, 111, 112, 113

[56] References Cited

U.S. PATENT DOCUMENTS

| | | | |
|---|---|---|---|
| 34,516 | 1/1994 | Houghton | 385/109 X |
| 4,205,899 | 6/1980 | King et al. | 385/111 X |
| 4,230,395 | 10/1980 | Dean et al. | 350/96.23 |
| 4,354,732 | 10/1982 | Arnaud et al. | 385/111 |
| 4,435,238 | 3/1984 | Smith | 385/109 X |
| 4,474,426 | 10/1984 | Yataki | 350/96.23 |
| 4,619,107 | 10/1986 | Missout et al. | 57/6 |
| 4,690,499 | 9/1987 | Taylor et al. | 350/96.23 |
| 4,695,128 | 9/1987 | Zimmerman et al. | 350/96.23 |
| 4,759,602 | 7/1988 | Pascher | 350/96.23 |
| 4,775,213 | 10/1988 | Kitayama | 385/109 X |
| 4,783,954 | 11/1988 | Akre | 57/9 |
| 4,786,137 | 11/1988 | Cornelison et al. | 350/96.23 |
| 4,830,459 | 5/1989 | Chicken et al. | 385/109 |
| 4,836,639 | 6/1989 | Shamoto et al. | 385/109 |
| 4,859,023 | 8/1989 | Eichenbaum et al. | 385/109 |
| 4,921,413 | 5/1990 | Blew | 425/71 |
| 4,944,570 | 7/1990 | Oglesby et al. | 350/96.23 |
| 4,983,013 | 1/1991 | Dotzer et al. | 385/110 |
| 4,983,333 | 1/1991 | Blew | 264/1.5 |
| 5,082,380 | 1/1992 | Sutehall et al. | 385/110 X |
| 5,098,177 | 3/1992 | Tanaka | 385/110 |
| 5,125,063 | 6/1992 | Panuska et al. | 385/113 |
| 5,140,664 | 8/1992 | Bosisio et al. | 385/109 |
| 5,218,659 | 6/1993 | Schneider | 385/110 |

FOREIGN PATENT DOCUMENTS

| | | | |
|---|---|---|---|
| 0353555 | 7/1990 | European Pat. Off. | 385/112 X |
| 59-111106 | 6/1984 | Japan | G02B 5/16 |
| 60-257414 | 12/1985 | Japan | G02B 6/44 |
| 62-65006 | 3/1987 | Japan | G02B 6/44 |

OTHER PUBLICATIONS

Derwent, World Patents Abstracts, Soviet Patents Abstracts, PQ General/Mechanical, Week 9323, Patents 230322–1742960, Issued Jul. 28, 1993.
International Search Report mailed Sep. 8, 1995 for PCTUS95/06628.

Primary Examiner—Brian Healy
Attorney, Agent, or Firm—Bell, Seltzer, Park & Gibson, P.A.

[57] ABSTRACT

A fiber optic cable according to the present invention includes at least one lengthwise extending channel surrounding an elongate central support member with each channel defining a channel axis. At least one optical fiber is positioned within each channel and has an average position offset in a direction generally radially inward from the channel axis toward the central support member at about room temperature. In one embodiment, the at least one channel is defined by one or more buffer tubes stranded about the central support member. In another embodiment, the at least one channel is defined by core having one or more lengthwise extending slots. The fiber optic cable may also include a protective jacket surrounding the central support member and the channel defining means. The optical fibers typically have a coefficient of thermal expansion less than the respective coefficient of thermal expansion of at least one of the protective jacket, the channel defining means and central support member. Thus, by offsetting the average position of the optical fibers at about room temperature in a direction extending generally radially inward from the channel axis, the thermal contraction window of the fiber optic cable is thereby increased. The fiber optical cable of the present invention thus provides consistent optical signal transmission performance over a predetermined range of temperatures and as the cable is placed under tensile loads up to a predetermined maximum load due to the optimized elongation and contraction windows.

38 Claims, 5 Drawing Sheets

FIBER OPTIC CABLE HAVING EXTENDED CONTRACTION WINDOW AND ASSOCIATED METHOD AND APPARATUS FOR FABRICATING THE CABLE

FIELD OF THE INVENTION

The invention relates to the field of communication cables and, more particularly, to a fiber optic cable and an associated apparatus and method for fabricating the cable.

BACKGROUND OF THE INVENTION

Communication cables employing optical fibers are widely used in the telecommunications industry. In particular, multifiber cables are widely used for long distance telephone communications, interexchange telephone applications, and other telephony and data transmission applications. Fiber optic cables are also being incorporated into cable television networks in place of more traditional coaxial cables. Optical fibers may permit long distances between signal repeaters or eliminate the need for such repeaters altogether. In addition, optical fibers offer extremely wide bandwidths and low noise operation.

A fiber optic cable typically includes a core and an outer protective jacket. One or more optical fibers are contained within the core. For a typical cable, such as used for long distance communications, the fibers are maintained in a loose-buffered relationship within a channel defined by the core to isolate the fibers from at least some of the strain imparted to the cable as the cable is installed and thereafter.

The core of a typical loose-buffered cable, such as available from Siecor of Hickory, N.C. under the designation MINIBUNDLE™, includes a series of plastic buffer tubes stranded around a central support member in a concentric layer. In this design, the plastic buffer tubes define the channels of the core. One or more optical fibers are generally disposed in each of the plastic buffer tubes. The optical fibers may be disposed within the buffer tubes either individually or as bundles of optical fibers about which a binder is wrapped. The optical fibers may also be disposed in one or more fiber ribbons within the buffer tubes.

Alternatively, the core may include a slotted core, typically comprised of plastic, extruded about a central support member. The slotted core includes one or more longitudinally extending slots, each of which defines a channel having a longitudinal axis. The slots defined by the slotted core typically extend helically or in a reverse oscillating helical lay pattern. One or more optical fibers, typically arranged individually, in fiber bundles or in a fiber ribbon, are disposed within the slots of the core. In one embodiment of a slotted core fiber optic cable, buffer tubes, each containing one or more optical fibers arranged individually, in fiber bundles or in a fiber ribbon, may be disposed within the slots.

While the fibers are maintained in a loose-buffered relationship within the respective channels, the optical fibers each typically maintain an average position along the centerline or axis of the respective channel, such as the buffer tube axis of the respective buffer tube or the axis of the respective core slot. For example, the position of an optical fibers of a conventional stranded buffer tube fiber optic cable is offset from the buffer tube axis of the respective buffer tube by various radial distances and in varying directions at different locations along the length of the fiber optic cable. However, the average position of the optical fibers of such conventional cables, taken over the length of the cable, extends along the buffer tube axis at about room temperature.

Fiber optic cables, such as those used for long distance communications or cable television networks, typically include aerially installed portions and extend between vertical supports, such as utility poles. These cables desirably provide optical signal transmission with a relatively low predetermined attenuation per distance over a desired temperature range. For example, conventional fiber optic cables are designed to provide consistent optical signal transmission over the temperature range of –40° C. to 70° C., as defined by the Bellcore specifications for fiber optic cables.

The components of a conventional fiber optic cable expand and contract differently over the desired operating temperature range due to the different coefficients of thermal expansion of the various materials from which the cable components are fabricated. For example, the buffer tubes and the protective jacket surrounding the buffer tubes of a typical stranded buffer tube fiber optic cable are generally formed of a plastic material. Likewise, for a slotted core cable, the slotted core extruded about the central support member as well as the surrounding protective jacket are also generally formed of a plastic material. In addition, the central support member is typically formed of a dielectric material, such as glass reinforced or aramid reinforced plastic, or one or more metal wires.

With the exception of the optical fiber, the cable components, such as the protective jacket, central support member and buffer tubes or slotted core, are bound together such that these cable components expand and contract in substantially equal amounts. In particular, the cable components, with the exception of the optical fibers, have an effective coefficient of thermal expansion, $\alpha_{EFF}$, of:

$$\alpha_{EFF} = \frac{\sum_{i=1}^{n} A_i E_i \alpha_i}{\sum_{i=1}^{n} A_i E_i} \qquad (1)$$

wherein $A_i$ is the respective cross-sectional area of each material, designated i, from which the cable is comprised; $E_i$ is the respective Young's Modulus of each material; and $\alpha_i$ is the respective coefficient of thermal expansion of each material.

In contrast, the optical fibers are not typically bound to other cable components, but are instead loosely placed within one or more lengthwise extending channels. The optical fibers are also generally comprised of a material, such as glass, which has a coefficient of thermal expansion significantly less than the effective coefficient of thermal expansion of the other cable components, $\alpha_{EFF}$. Accordingly, the combination of the other cable components typically expands and contracts to a greater extent than do the optical fibers as the temperature increases and decreases, respectively. Thus, the optical fibers of conventional fiber optic cables, such as a stranded buffer tube fiber optic cable or a slotted core fiber optic cable, shift in position radially within the defined channels as a result of the different rates of thermal expansion and contraction between the optical fibers and the other cable components.

For example, within a conventional fiber optic cable in which the buffer tubes are stranded around a central support member, the optical fibers shift in a direction extending generally radially inward from the buffer tube axis and toward the central support member as the temperature increases or as a tensile load is applied to the cable. Alternatively, the optical fibers of such a conventional fiber optic cable typically shift in a direction extending generally radially outward from the buffer tube axis and away from the central support member as the temperature decreases.

The optical fibers of a conventional fiber optic cable shift within the respective channels to accommodate the different rates of either elongation and contraction until the optical fibers break or are forced to bend excessively, such as at relatively cold temperatures in which the optical fibers may be excessively bent by contraction of the other cable components. In instances in which the optical fibers bend excessively, the attenuation of the optical signal transmission increases greatly. In addition, the optical fibers may break if subjected to excessive tensile forces, since conventional optical fiber may typically only elongate by about 1% of their length prior to breaking.

The maximum elongation withstood by a fiber optic cable without imparting strain to the optical fibers is typically termed the elongation window of the cable. Likewise, the maximum contraction withstood by a fiber optic cable without excessively bending the optical fibers so as to significantly attenuate the signal transmission is typically termed the contraction window of the cable. Generally, the elongation and contraction windows of a fiber optic cable are determined at a reference temperature, such as room temperature.

The contraction window and the expansion window are defined, in part, by the size of the channels, such as the interior diameter of the buffer tubes or the size of the slots in a slotted core, the number of optical fibers disposed within each channel, the diameter of the optical fibers and the shape of the channels, such as the helix diameter and pitch length of channels which surround the central support member in a helical or reverse oscillating helical lay pattern. For example, in a stranded buffer tube fiber optic cable, an increase in the interior diameter of the buffer tubes or a decrease in the number of optical fibers disposed therein will enlarge both the contraction and expansion windows even though the fibers still have an average position at the axis of the buffer tubes at room temperature.

The elongation and contraction windows of a cable are described, for example, in U.S. Pat. No. 4,695,128 to Zimmerman et al. This patent discloses a fiber optic cable having a plurality of buffer tubes stranded about a central strength member wherein the buffer tubes are rectangular or elliptical in cross-section. The major axis of an elliptical buffer tube or the longer side of a rectangular buffer tube extends radially outward from the central support member. The rectangular or elliptical buffer tubes enlarge the contraction and elongation windows by providing the optical fibers additional space in which to shift radially to compensate for differences in elongation and contraction.

U.S. Pat. No. 4,944,570 Oglesby et al. discloses an overhead ground wire fiber optic cable having an extended elongation window. The overhead ground wire includes a plurality of buffer tubes stranded about a central strength member wherein the optical fibers are longer than the buffer tubes to thereby increase the expansion window of the cable. For example, the ratio of the length of the fibers to the length of the respective buffer tubes is defined as 1.001 to 1.005 in one embodiment of the overhead ground wire fiber optic cable.

In addition, Japanese Patent No. 60-257,414 to Katsuyama Yutaka et al. discloses a fiber optic cable in which one or more optical fibers are disposed within each of a plurality of pipes, such as buffer tubes. The pipes are, in turn, twisted about a central support member. This patent relates the respective coefficients of thermal expansion of the optical fibers and the cable at about room temperature and at a predetermined maximum temperature. The pitch of the pipes and the clearance between the optical fibers and the pipes are also selected to ensure operation of the cable from room temperature to a predetermined maximum temperature.

A fiber optic cable is preferably designed to be relatively small in transverse cross-section. Accordingly, the channels, such as buffer tubes or slots defined by a slotted core, are preferably not excessively large even though an increase of the internal diameter of the buffer tubes or the size of a slot would generally increase the elongation and contraction windows of the cable. In addition, conventional fiber optic cables include a predetermined number of optical fibers. In many instances, it is not desirable to decrease the number of optical fibers within each channel even though a decrease in the number may increase both the elongation and contraction windows of the cable. Rather, it is typically desirable to include as many optical fibers as possible within each channel to maximize the fiber count per cross-sectional size of the cable and, thus, the overall optical signal transmission capacity of the cable versus cable cost.

In many instances, the elongation window of a fiber optic cable is sufficient to permit operation of the fiber optic cable up to a predetermined maximum temperature and under a predetermined maximum tensile load. However, the contraction window of such fiber optic cables is oftentimes insufficient. Accordingly, the optical fibers are not permitted to adequately shift radially outward relative to the channel axis and away from the central support member at low temperatures. Instead, the shifting of the optical fibers is limited such that the optical fibers are excessively bent and the attenuation of the optical signal transmission is significantly increased at such relatively low temperatures.

SUMMARY OF THE INVENTION

In view of the foregoing background, it is an object of the invention to provide a fiber optic cable and an associated method and apparatus for fabricating the cable which is suited for optical signal transmission over a predetermined temperature range and subject to tensile loads up to a predetermined maximum load with generally uniform signal attenuation.

It is another object of the invention to provide a fiber optic cable and an associated method and apparatus for fabricating the cable which has an extended thermal contraction window.

These and other objects, advantages and features of the present invention are provided by a fiber optic cable including channel defining means for defining at least one channel extending generally lengthwise adjacent an elongate central support member with each of the channels defining a channel axis, and optical fiber positioned within each of the channels to have an average position offset in a direction generally radially inward from the channel axis toward the central support member at about room temperature, that is, over the range of about 20° C. to about 26° C. The cable also preferably includes a protective jacket surrounding the channel defining means and the central support member. The optical fibers typically have a coefficient of thermal expansion less than a respective coefficient of thermal expansion of the channel defining means and the protective jacket. Accordingly, by offsetting the average position of the optical fibers in a direction extending generally radially inward from the channel axis toward the central support member at about room temperature, the thermal contraction window of the fiber optic cable is thereby increased.

In one embodiment, the channel defining means includes at least one lengthwise extending buffer tube surrounding the central support member. The average position offset of the optical fibers at about room temperature and the interior diameter of the buffer tubes are preferably selected so that the optical fibers have a generally uniform attenuation down to a temperature of at least predetermined minumum temperature, such as about −40° C. The average position offset is preferably between about 1% and about 49% of the interior diameter of a buffer tube.

The average position offset of the optical fibers at about room temperature and the interior diameter of the buffer tubes also preferably define a spacing between the optical fibers and an adjacent interior portion of the buffer tubes. This spacing between the optical fibers and the adjacent interior portion of a buffer tube provides a predetermined elongation window for the fiber optic cable. Preferably, the average position offset of the optical fibers at about room temperature and the interior diameter of the buffer tubes are selected so that the optical fibers have a generally uniform attenuation and are not subjected to excessive strain up to a temperature of at least about 70° C. and as the cable is placed under a tensile load of up to 600 lbs.

The buffer tubes and the protective jacket are typically plastic and the central support member is generally comprised of at least one metal wire or a dielectric material. The buffer tubes also preferably have a predetermined circular cross-sectional shape.

The buffer tubes are preferably positioned circumferentially around the central support member in side-by-side relation. In one embodiment, the plurality of buffer tubes are positioned in at least two layers around the central support member. The buffer tubes are also generally arranged in either a reverse oscillating helical lay pattern or a helical lay pattern around the central support member. Further, in one embodiment, the fiber optic cable of the present invention includes at least one lengthwise extending filler element surrounding the central support member.

In another embodiment of the present invention, the channel defining means includes an elongate slotted core. The elongate slotted core preferably surrounds the central support member and defines at least one generally lengthwise extending slot. The slot, in turn, defines the channel for receiving at least one optical fiber.

A method aspect of the invention is for fabricating the fiber optic cable and includes the step of positioning the optical fibers within the channels so as to have an average position offset in a direction extending generally radially inward from the channel axis toward the central support member at about room temperature. One embodiment of this method, as applied to the fabrication of stranded buffer tube fiber optic cables, includes the step of applying tension to each of the buffer tubes to elongate the buffer tubes. A protective jacket may thereafter be extruded about the plurality of buffer tubes.

An apparatus according to the invention for fabricating a stranded buffer tube fiber optic cable having an extended contraction window includes stranding means for positioning at least one buffer tube about an elongate central support member and tensioning means for applying tension to the buffer tubes while the buffer tubes are positioned about the central support member. The buffer tubes are elongated by the tension such that the optical fibers positioned within the buffer tubes have an average position offset in a direction extending radially inward from the buffer tube axis toward the central support member at about room temperature. The apparatus for fabricating a fiber optic cable according to the present invention also preferably includes extrusion means for extruding a protective jacket about the buffer tubes positioned around the central support member.

A second embodiment of the method for fabricating a fiber optic cable according to the present invention includes the steps of disposing at least one optical fiber within each channel so that the length of the optical fibers is less than the length of the respective channel. In one aspect of this embodiment of the method of this invention, tension is applied to the optical fibers while disposing the optical fibers in respective channels. The tension elastically elongates the optical fibers relative to the channel defining means. Once the optical fibers are positioned about the central support member, the tension of the fibers is released and the optical fibers shift radially inward from the channel axis toward the central support member to establish the average position offset at about room temperature.

In another aspect of this embodiment of the method for fabricating a fiber optic cable according to the present invention, respective channels are defined by buffer tubes that are each extruded about at least one optical fiber. The extruded buffer tubes are then rapidly cooled. Due to the rapid cooling, the contraction of the buffer tubes is retarded such that the optical fibers are elastically elongated relative to the buffer tubes.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. Prime notation is used to indicate similar elements in alternate embodiments.

Figure 1:
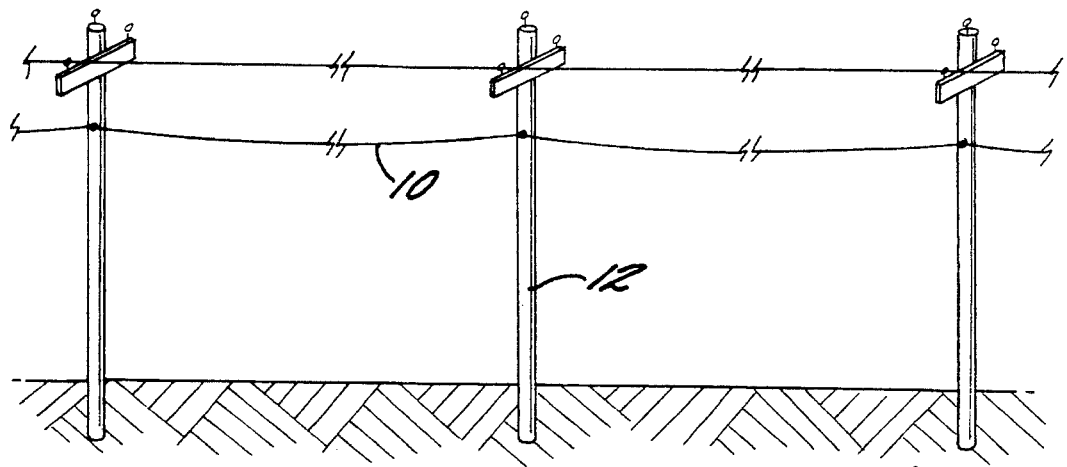
FIG. 1 is a perspective view of an aerially installed fiber optic cable having an extended contraction window according to the invention.
Figure 2:
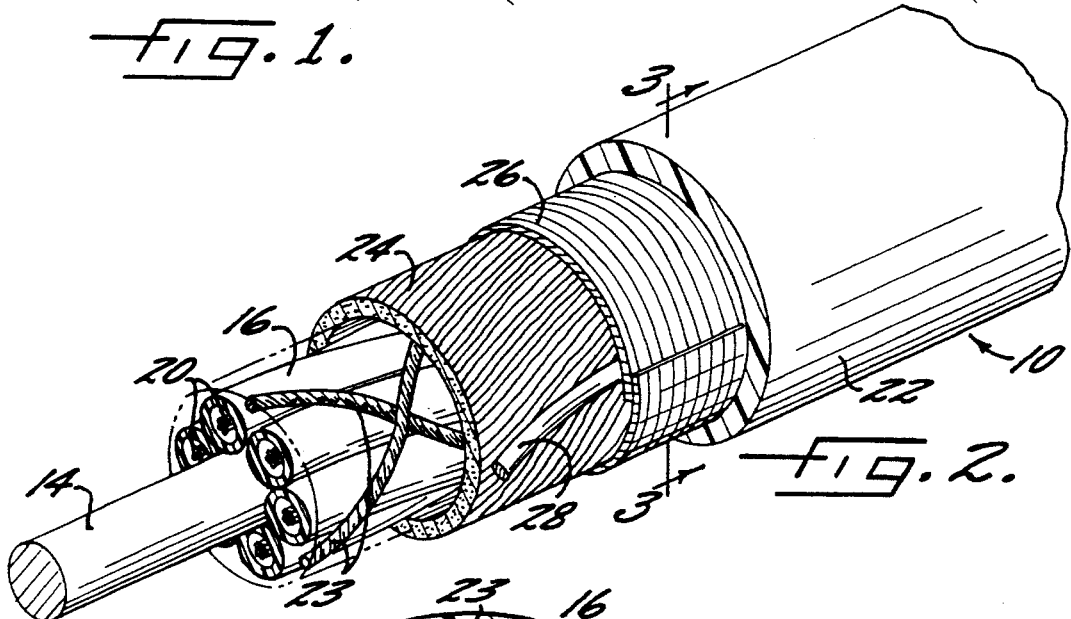
FIG. 2 is a fragmentary perspective view of an end portion of a fiber optic cable according to the invention.
Figure 3:
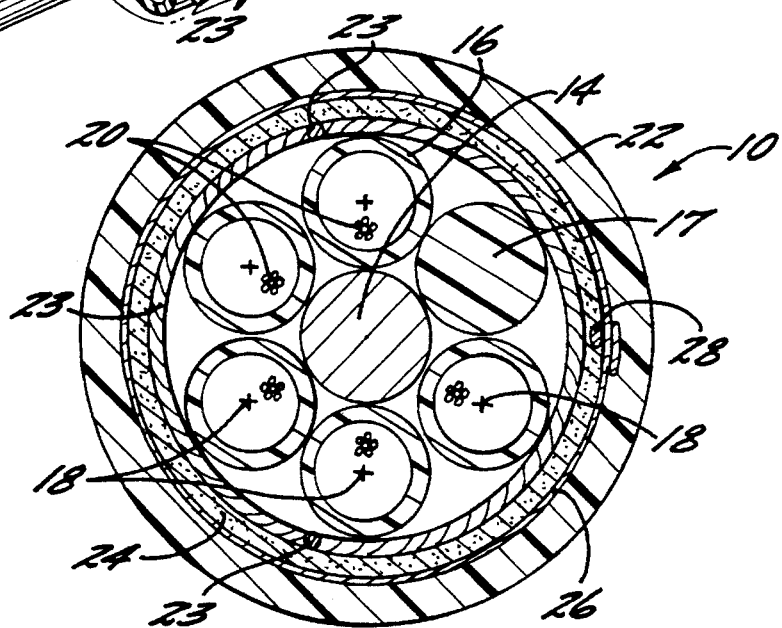
FIG. 3 is a cross-sectional view of the fiber optic cable of FIG. 2 taken along lines 3—3.

Referring now to FIGS. 1–3, a fiber optic cable 10 according to the present invention is illustrated. The fiber optic cable 10 provides optical signal transmission with a generally uniform attenuation over a predetermined range of temperatures when subjected to tensile loads up to a predetermined maximum load. The fiber optic cable 10 is illustrated installed aerially to extend between utility poles or supports 12 so that the cable is exposed to varying weather conditions. A typical aerially installed fiber optic cable 10 is used for long distance telephone communications or cable television, such as a distribution or trunk cable. Accordingly, such an aerially installed fiber optic cable 10 is typically lashed or stranded about a messenger (not illustrated), typically comprised of a plurality of steel wires, which supports the cable. Although the cable 10 of the present invention is illustrated installed aerially, the cable may also be buried, such as in a duct.

The fiber optic cable 10 includes an elongate, lengthwise extending central support member 14 and channel defining means for defining a channel generally lengthwise adjacent the central support member. Each channel, in turn, defines a channel axis. As perhaps best shown in FIGS. 2 and 3, one embodiment of the fiber optic cable 10 is a stranded buffer tube fiber optic cable which includes a central support member 14 and at least one lengthwise extending plastic buffer tube 16 surrounding the central support member. Each buffer tube defines a buffer tube axis 18, as shown in FIG. 3. In addition, at least one optical fiber 20 is positioned in a loose-buffered relationship within each of the buffer tubes 16. The optical fibers have an average position offset in a direction extending radially inward from the buffer tube axis 18 toward the central support member 14 at about room temperature, that is over the range of temperatures from about 20° C. to about 26° C. The fiber optic cable 10 may also include a protective plastic jacket 22 surrounding the buffer tubes 16.

Due to the materials from which the cable is fabricated, the coefficient of thermal expansion of the optical fibers is typically less than the effective coefficient of thermal expansion, $\alpha_{EFF}$, of the other cable components. In other words, the coefficient of thermal expansion of the optical fibers 20 is typically less than at least one of the respective coefficients of thermal expansion of the at least one buffer tube 16, the protective jacket 22 and the central support member 14.

Accordingly, at about room temperature, the average position offset $d_s$ of the optical fibers within a buffer tube in the direction extending generally radially inward from the buffer tube axis 18 toward the central support member 14 increases the thermal contraction window of the fiber optic cable 10 of the present invention relative to a conventional fiber optic cable in which the average position of the optical fibers extends along the channel axis, such as the buffer tube axis. The thermal contraction window of the fiber optic cable 10 is increased by offsetting the average position of the optical fibers 20 radially inward from the buffer tube axis 18 toward the central support member 14 since the optical fibers are thereby provided additional space in which to shift radially outward upon contraction of the fiber optic cable, such as at relatively low temperatures.

The coefficient of thermal expansion of the optical fibers is less than the effective coefficient of thermal expansion, $\alpha_{EFF}$, of the other cable components due to the properties of the materials from which these other cable components are comprised. For example, the optical fibers 20 are generally glass with a protective polymer coating thereon, while the buffer tubes 16 and the protective jacket 22 are typically plastic. More specifically, the protective jacket 22 may be polyethylene as would be readily understood by those skilled in the art. The buffer tube 16 may also be a thermoplastic polymer, such as polybutylene terephthalate, acetal or polypropylene.

In addition, the central support member 14 is preferably a rod, a wire or a strand of wires of a material having a relatively high tensile modulus, such as steel or a reinforced dielectric material such as glass or aramid reinforced plastic. Although not illustrated, the central support member 14 may also include a plastic covering as known to those skilled in the art.

Due to the differences in the respective coefficients of thermal expansion, the optical fibers 20 elongate and contract less than the other cable components. Thus, the optical fibers 20 must shift within the stranded buffer tubes 16 to compensate for the differences in elongation and contraction of the cable.

Figure 4:
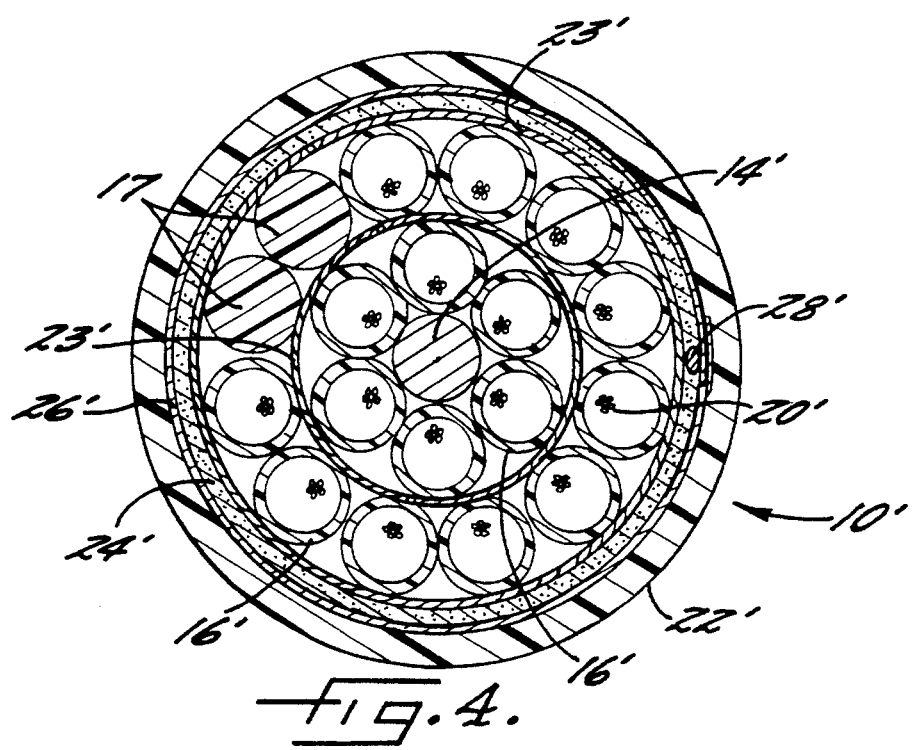
FIG. 4 is a cross-sectional view of an embodiment of the fiber optic cable of the present invention which includes two layers of buffer tubes around a central support member.

As illustrated in FIG. 3, the buffer tubes 16 generally have a predetermined circular cross-sectional shape. In addition, the buffer tubes 16 are generally positioned circumferentially around the central support member 14 in side-by-side relation. In other embodiments, the buffer tubes 16' are positioned in two or more layers around the central support member 14'. For example, as illustrated in FIG. 4, an alternate embodiment of a fiber optic cable 10' includes a first or inner layer of six buffer tubes 16' positioned circumferentially around a central support member 14' in side-by-side relation. A second layer of twelve buffer tubes 16' may also be positioned circumferentially around the central support member 14' and the first layer of buffer tubes in a side-by-side relation. The other elements of this fiber optic cable 10' embodiment are indicated with prime notation and are similar to those discussed herein with regard to the first illustrated embodiment. As would be readily understood by those skilled in the art, fiber optic cables which include two or more layers of buffer tubes are generally high fiber count cables which include a large number of optical fibers, such as, for example, 216 optical fibers.

The fiber optic cable 10 of the present invention may also include one or more filler elements 17. As illustrated in FIGS. 3 and 4, the filler elements 17 are generally comprised of a plastic material and are typically substantially the same size and shape as the buffer tubes 16. In the embodiments of FIGS. 3 and 4, the filler elements 17 and the buffer tubes 16 are positioned circumferentially around the central support member 14 in side-by-side relation. Although the filler elements 17 are shown as solid rods, the filler elements may also be tubular as known to those skilled in the art.

Figure 5:
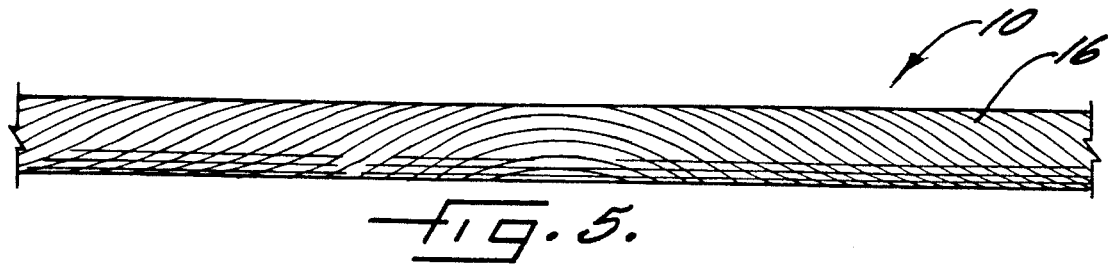
FIG. 5 is a side elevational view of a portion of a fiber optic cable of the invention with the outer protective jacket removed to illustrate the buffer tubes positioned in a reverse oscillating helical lay pattern.
Figure 6:
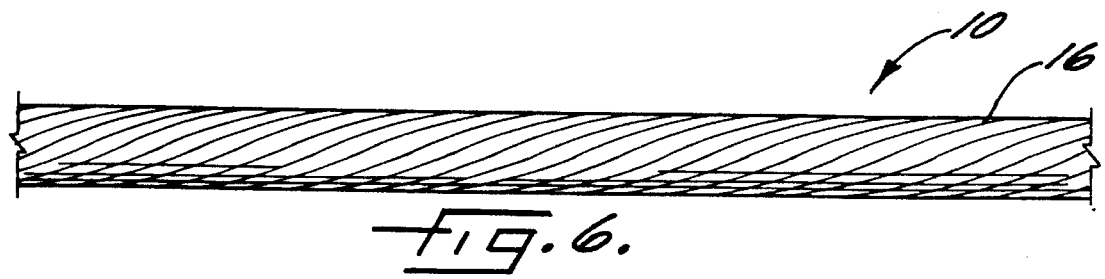
FIG. 6 is a side elevational view of a portion of a fiber optic cable of the invention with the outer protective jacket removed to illustrate the buffer tubes positioned in a helical lay pattern.

The plurality of buffer tubes 16 are preferably stranded about the central support member 14. A binder 23, such as a yarn, is typically wrapped about the buffer tubes to secure the buffer tubes to the central support member 14 to facilitate handling during manufacturing. As illustrated in FIG. 2, the binder 23 may include one or more wrappings of yarn helically stranded about the buffer tubes 16. As shown in FIG. 4, a fiber optic cable 10' which includes first and second layers of buffer tubes 16, and filler elements 17' preferably has first and second binders 23' stranded about the first and second layers, respectively. As would be readily understood by those skilled in the art, the buffer tubes 16, and filler elements 17 if any, of one embodiment of the invention are arranged in a reverse oscillating helical lay pattern as illustrated in FIG. 5. In another embodiment, the buffer tubes 16, and filler elements 17 if any, may be arranged in a helical lay pattern around the central support member 14 as shown in FIG. 6.

As would also be readily understood by those skilled in the cable art, the fiber optic cable 10 according to the invention also preferably includes lengthwise extending means for imparting tensile strength to the cable, such as one or more helically wrapped aramid yarns 24, e.g. KEVLAR® yarn available from duPont, surrounding the buffer tubes 16. The lengthwise extending strength means may be provided by other materials, such as a variety of yarns, including glass yarns, metal wire, strands of metal wires, glass rovings, or aramid or glass reinforced plastic rods, for example.

In addition, the fiber optic cable 10 also preferably includes a metallic armor layer 26 surrounding the lengthwise extending strength means 24. The surrounding metallic armor layer 26 provides additional protection for the cable and is preferably corrugated to allow the fiber optic cable 10 to flex. The lengthwise extending strength means may also include one or more strength members extending longitudinally along the buffer tubes 16 and outside the armor layer 26. The strength members may be a pair of opposed solid steel wires, not shown, which have a predetermined diameter to provide strength to the cable to resist pulling tension and bending forces. A ripcord 28 may also extend longitudinally under the armor layer 26 to facilitate removal of the armor layer 26 and the protective jacket 22.

Figure 7:
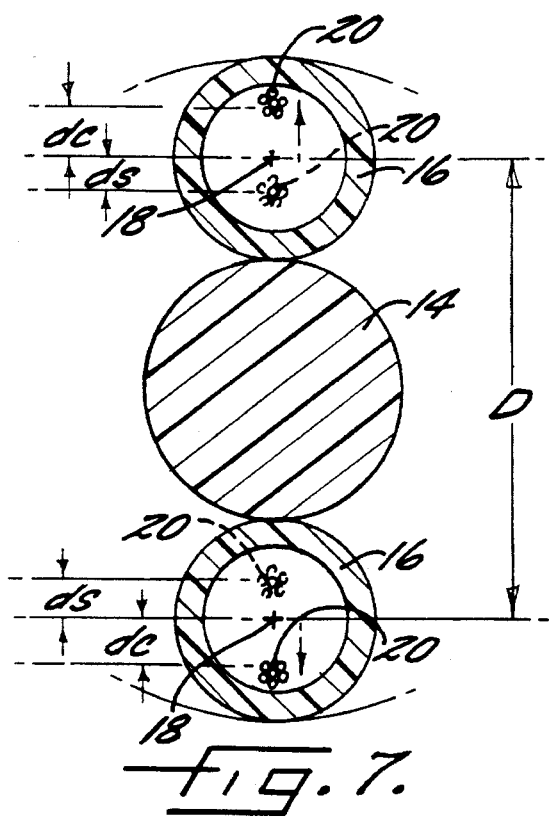
FIG. 7 is a cross-sectional view of a portion of the fiber optic cable of the present invention which illustrates the radially outward movement of the optical fibers during contraction of the fiber optic cable, such as at relatively low temperatures.

FIG. 7 illustrates, in transverse cross-section, a portion of a stranded buffer tube fiber optic cable 10 of the present invention showing two buffer tubes 16 positioned on opposite sides of the central support member 14. The protective jacket 22 and the other buffer tubes 16 have not been depicted in FIG. 7 in order to more clearly illustrate the average position offset $d_s$ of the optical fibers 20 of a fiber optic cable of the invention and the movement of those optical fibers upon contraction of the fiber optic cable 10. The placement of the optical fibers 20 at the average position offset at about room temperature is illustrated by the dashed lines in FIG. 7. The solid lines indicate the position of the optical fiber 20 during thermally induced contraction of the cable 10.

The average position offset $d_s$ of the optical fibers 20 in a direction extending radially inward from the buffer tube axis 18 toward the central support member 14 may be computed as follows:

$$d_s = \frac{1}{2}\left[ D - \frac{1}{\pi}\sqrt{\frac{1}{(1+\epsilon)^2}(\pi^2 D^2 + P^2) - P^2} \right] \quad (2)$$

wherein D is the center-to-center spacing between the buffer tube axes 18 of opposed buffer tubes 16, as shown in FIG. 7; and P is the pitch length of the helically wound buffer tubes. In addition, $\epsilon$ is based upon the difference in length of the optical fibers 20 and the buffer tubes 16. More specifically, $\epsilon$ is computed as:

$$\epsilon = \frac{L_B}{L_F} - 1 \quad (3)$$

wherein $L_B$ is the length of the buffer tubes 16 and $L_F$ is the length of the optical fibers 20. For fiber optic cables 10 fabricated according to the method of the present invention in which tension is applied to the buffer tubes during the manufacture of the fiber optic cable, $\epsilon$ is also related to the elongation of the buffer tubes 16, as described in more detail hereinbelow and as reflected in Equation (3) above.

The center-to-center spacing D may be computed based upon the diameters of the center support member 14 and the buffer tubes 16. The diameter of the center support member 14 preferably ranges between 3.0 mm and 4.0 mm and, more preferably, is 3.3 mm. Accordingly, for a fiber optic cable 10 having a single layer of buffer tubes 16, each having an outer diameter of about 3.0 mm, surrounding the central support member 14, the preferred center-to-center spacing D of the buffer tube axes of opposed buffer tubes is about 6.30 mm.

In addition, the pitch length P of a stranded buffer tube fiber optic cable 10 of the present invention preferably ranges between 90 mm and 180 mm and, more preferably, for a fiber optic cable having a single layer of buffer tubes 16 surrounding the central support member 14, the pitch length P is between 90 mm and 120 mm.

As described hereinabove, the contraction window of a fiber optic cable is defined as the maximum amount which a cable may contract without bending the optical fibers excessively and significantly increasing the attenuation of the optical signal transmission. For a conventional fiber optic cable in which the average position of the optical fibers is along the buffer tube axis, the contraction window $\epsilon_c$ may be computed as:

$$\epsilon_c = 1 - \sqrt{1 - \frac{\pi^2}{P^2} 4 d_c (D + d_c)} \quad (4)$$

wherein $d_c$ is the distance which an optical fiber may move in a direction radially outward from the average axial position prior to contacting the wall of the buffer tube.

In contrast, for a fiber optic cable 10 of the present invention having an extended thermal contraction window, the extended thermal contraction window $\epsilon_c'$ may be calculated as:

$$\epsilon_c' = 1 - \sqrt{1 - \frac{\pi^2}{P^2} 4 d_c (D + d_c) - \frac{\pi^2}{P^2} 4 d_s (D - d_s)} \quad (5)$$

Thus, the thermal contraction window of the fiber optic cable 10 of the present invention is larger than the contraction window of a conventional fiber optic cable and provides sufficient space for the optical fibers 20 to shift radially outward away from the central support member 14 to provide optical signal transmission with a generally uniform attenuation down to at least a predetermined minimum temperature. This radially outward movement of the optical fibers 20 of the cable 10 of the present invention, such as at relatively low temperatures, is illustrated in FIG. 7.

Figure 8:
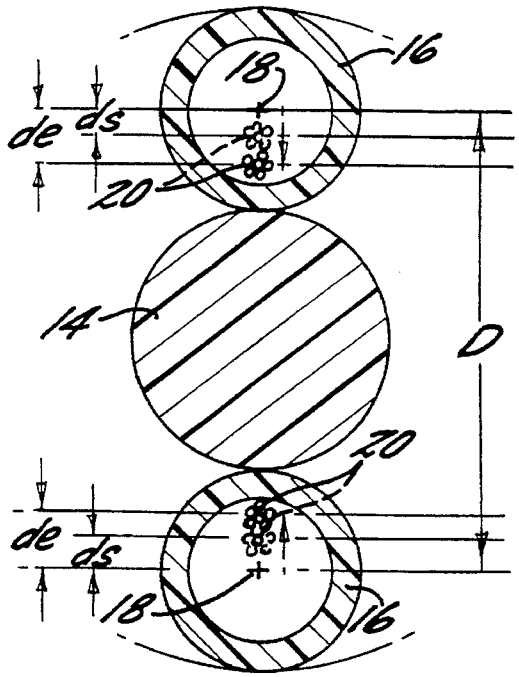
FIG. 8 is a cross-sectional view of a portion of the fiber optic cable of the present invention which illustrates the radially inward movement of the optical fibers during elongation of the fiber optic cable, such as at relatively high temperatures.

Referring now additionally to FIG. 8, the average position offset $d_s$ of the optical fibers 20 at about room temperature and the interior diameter of the buffer tubes 16 also preferably define a spacing between the optical fibers and an adjacent interior portion of the buffer tube. Thus, a predetermined elongation window is provided for the fiber optic cable 10 of the invention so that the optical fibers 20 may shift radially inward toward the central support member 14 upon elongation of the fiber optic cable 10, such as upon application of a tensile force to the cable.

The elongation window $\epsilon_e$ of a conventional fiber optic cable in which the average position of the optical fiber extends along the buffer tube axis may be computed as:

$$\epsilon_e = \sqrt{1 + \frac{\pi^2}{P^2} 4d_e(D-d_e)} - 1 \qquad (6)$$

wherein $d_e$ is the radially inward distance which an optical fiber may shift from the buffer tube axis prior to contacting the wall of the buffer tube.

The elongation window $\epsilon_e'$ of the cable 10 of the present invention may be computed as:

$$\epsilon_e' = \sqrt{1 + \frac{\pi^2}{P^2} 4d_e(D-d_e) - \frac{\pi^2}{P^2} 4d_s(D-d_s)} - 1 \qquad (7)$$

Accordingly, the elongation window $\epsilon_e'$ of the fiber optic cable 10 of the present invention is less than the elongation window $\epsilon_e$ of a conventional fiber optic cable 10. However, the elongation window $\epsilon_e'$ of the fiber optic cable 10 of the present invention still provides sufficient space for the optical fibers 20 to shift radially inward toward the central support member 14, prior to elongating, upon elongation of the fiber optic cable 10. By providing sufficient space for the optical fibers to shift radially outward, the fiber optic cable 10 provides signal transmission with a generally uniform attenuation and protects the optical fibers from undesirable strain for cables subjected to temperatures up to at least a predetermined maximum temperature, such as 70° C., for example, and for cables subjected to a predetermined maximum tensile load, such as 600 pounds, for example.

In one embodiment of the invention, the predetermined temperature range in which the fiber optic cable 10 of the present invention provides optical signal transmission with generally uniform attenuation is at least about −40° C. to about 70° C. As would be readily appreciated by those skilled in the art, an optical fiber typically experiences a complete failure or loss of signal transmission when the fiber is broken, such as by excessive elongation. Likewise, an optical fiber experiences a sharp increase in attenuation when the fiber is bent, such as by contraction of the cable 10 such that the bend radius of the optical fiber is less than a predetermined minimum allowable bend radius for the fiber. Thus, for a fiber optic cable 10 having a predetermined number of optical fibers of a predefined size, comprised of materials having predetermined coefficients of thermal expansion and having buffer tubes surrounding the central support member according to a known pattern, the average position offset of the optical fibers 20 at about room temperature and the interior diameter of the buffer tube 16 are preferably selected so that the optical fiber has a generally uniform attenuation down to a temperature of at least predetermined minimum temperature, such as about −40° C. The average position offset of the optical fibers 20 at about room temperature and the interior diameter of the buffer tube 16 of such a cable 10 are also preferably selected so that the optical fibers 20 have a generally uniform attenuation up to at least a predetermined maximum temperature, such as about 70° C., and and as the cable is subjected to up to at least a predetermined maximum tensile load, such as about 600 pounds, for example.

More particularly, the average position offset of the optical fibers 20 of such a cable 10 is preferably selected from the range of about 1% to about 49% and, more preferably, from the range of about 4% to about 20% of the inner diameter of the buffer tube 16 in which the optical fibers are disposed in order to provide optical signal transmission with generally uniform attenuation. In one embodiment, the buffer tubes 16 preferably have an inner diameter between approximately 0.5 mm and 10.0 mm and, more preferably, have an inner diameter of 2.0 mm. Accordingly, for a buffer tube 16 having an inner diameter of between about 0.5 mm and 10.0 mm, the average position offset $d_s$ of the optical fibers is preferably between 0.005 mm and 4.9 mm and, more preferably, is between 0.02 mm and 2.0 mm. More specifically, for a buffer tube 16 having an inner diameter of 2.0 mm, the average position offset $d_s$ of the optical fibers 20 is generally between about 0.08 mm and 0.4 mm. In addition, the outer diameter of a buffer tube 16 having an inner diameter of 2.0 mm is preferably between 2.5 mm and 3.5 mm and, more preferably, is about 3.0 mm.

Figure 9:
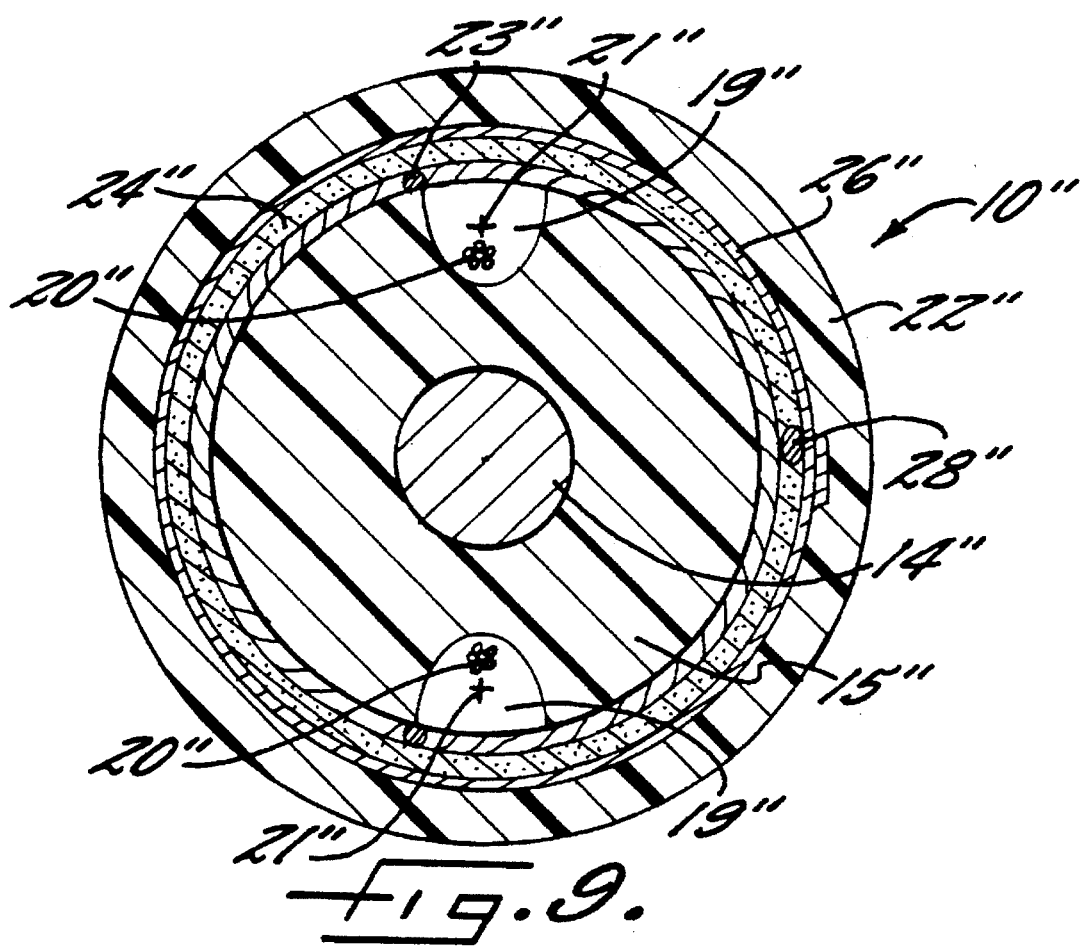
FIG. 9 is a cross-sectional view of a fiber optic cable of the present invention which includes a slotted core defining lengthwise extending channels for receiving one or more optical fibers.

As illustrated in FIG. 9, the fiber optic cable 10 of the present invention may be a slotted core fiber optic cable 10" which includes an elongate core 15", typically comprised of a plastic material that is generally extruded about the central support member 14". The core 15" defines one or more outwardly opening, generally lengthwise extending slots 19". These slots 19" define the channels which receive one or more optical fibers 20". In addition, the slots 19" define a generally lengthwise extending slot axis 21". As known to those skilled in the art, the slots 19" may be defined in the core 15" according to a number of patterns, such as, for example, a helical pattern or a reverse oscillating helical lay pattern.

As described hereinabove, the optical fibers 20" typically contract and expand less than the other cable components, including the slotted core 15". Thus, according to the present invention, the optical fibers 20" are positioned in a direction extending radially inward from the slot axis 21" defined by each respective slot 19". Accordingly, the thermal contraction window of the cable 10" having a slotted core 15" is increased in a like fashion as that described hereinabove with respect to a stranded buffer tube fiber optic cable.

Although the slotted core 15" illustrated in FIG. 9 surrounds a central support member 14", other embodiments of the slotted core fiber optic cable 10" may include a central support member which is integrally formed or extruded with the slotted core. For example, a slotted core fiber optic cable 10" may include an integral slotted core, a portion of which forms the central support member, without departing from the spirit and scope of the present invention.

The method for fabricating a fiber optic cable 10, such as either a stranded buffer tube or slotted core fiber optic cable, having an extended contraction window according to this invention includes the step of positioning at least one optical fiber 20 in at least one channel defined by the channel defining means so that the optical fibers of the thus-formed cable have an average position offset in a direction extending generally radially inward from the channel axis toward the central support member 14 at about room temperature.

According to one aspect of this method relating to the fabrication of a stranded buffer tube fiber optic cable, the optical fiber positioning step includes the step of disposing at least one optical fiber 20 within each buffer tube 16. Each buffer tube 16 is, in turn, thereafter positioned or stranded around a central support member 14. The optical fibers 20 disposed in the buffer tubes 16 according to this method are shorter than the length of the respective buffer tubes such that the optical fibers, once the buffer tubes are positioned around the central support member 14, have an average position offset $d_s$ in a direction extending radially inward from the respective buffer tube axis 18 toward the central support member at about room temperature.

Alternatively, a slotted core fiber optic cables 10" may be fabricated according to this aspect of the method by disposing one or more optical fibers 20" in the at least one slot 19" defined by the slotted core 15". The optical fibers 20" disposed in the slots 19" according to this aspect of the method are also shorter than the length of the slots, as measured along the slot axis 21", such that the optical fibers have an average position extending radially inward from the slot axis 21" toward the central support member 14 at about room temperature.

One embodiment of this aspect of the method for fabricating a fiber optic cable 10 in which the optical fibers 20 are shorter than the respective channels includes the step of applying tension to the optical fibers 20 during the disposing step to elastically elongate the optical fibers 20 such that the fibers are under strain or tension relative to the respective buffer tube 16 or slotted core 15". Thus, during positioning of the buffer tubes 16 about the central support member 14 or during positioning of the optical fibers 20" within the slots 19" defined by a slotted core 15", the optical fibers will assume the average position offset radially inward from the channel axis to relieve the tension applied thereto.

Figure 10:
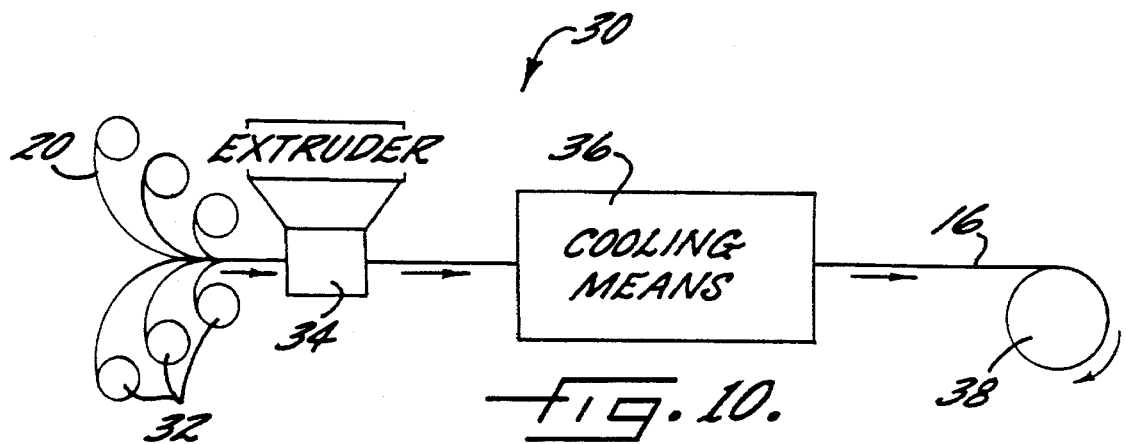
FIG. 10 is a schematic diagram of an apparatus for making a fiber optic cable according to the invention.

An apparatus 30 for applying tension to the optical fibers 20 which are disposed within a buffer tube 16 is illustrated in FIG. 10. As shown, optical fibers 20 may be drawn from a plurality of optical fiber supply reels 32 through an extruder 34 in which a buffer tube 16 is extruded around the optical fibers 20. As known to those skilled in the art, the extruded buffer tube 16 containing the optical fibers 20 generally passes through a cooling means 36, such as a tank having relatively cool water, to solidify the buffer tube prior to being wound upon a take-up reel 38. Each optical fiber supply reel 32 preferably includes means for adjusting the tension under which the optical fibers 20 are drawn from the optical fiber supply reels 32. By increasing the tension on the optical fiber supply reels 32, such as from the 30 grams to 80 grams of tension typically applied to optical fibers to, for example, 100 grams, the elastic elongation of the optical fibers 20 is increased.

Another embodiment this aspect of the method for fabricating a stranded buffer tube fiber optic cable 10 includes the step of rapidly cooling the buffer tube 16 following its extrusion about the optical fibers 20. The extruded buffer tube 16 may be rapidly cooled, for example, by immersing the buffer tube in increased amounts of relatively cool water. Due to the rapid cooling of the buffer tube 16, the buffer tube does not contract as significantly as do conventional buffer tubes which are more gradually cooled. Therefore, even though the optical fibers are elastically elongated somewhat, due to the typical application of about 30 grams to about 80 grams of tension to the fibers, the optical fibers 20 disposed in the rapidly cooled buffer tubes 16 will have an average position offset in a direction radially inward from the buffer tube axis 18 once the buffer tubes are positioned around the central support member 14. While the foregoing embodiments of this aspect of the method of this invention were separately described, it will be understood that increased amounts of tension may be applied to the optical fibers 20 simultaneously with the rapid cooling of the extruded buffer tubes 16 to further control the fabrication of a fiber optic cable 10 according to this invention.

A second aspect of the method for fabricating the stranded buffer tube fiber optic cable 10 of the present invention includes the steps of positioning at least one buffer tube 16 around a central support member 14 and applying tension to the at least one buffer tube to thereby elongate the buffer tube relative to the optical fibers 20 disposed therein. By elongating the buffer tubes 16, the optical fibers 20 contained within each buffer tube will have an average position offset in a direction extending radially inward from the buffer tube axis 18 toward the central support member 14 at about room temperature, once the buffer tubes are positioned around the central support member.

Figure 11:
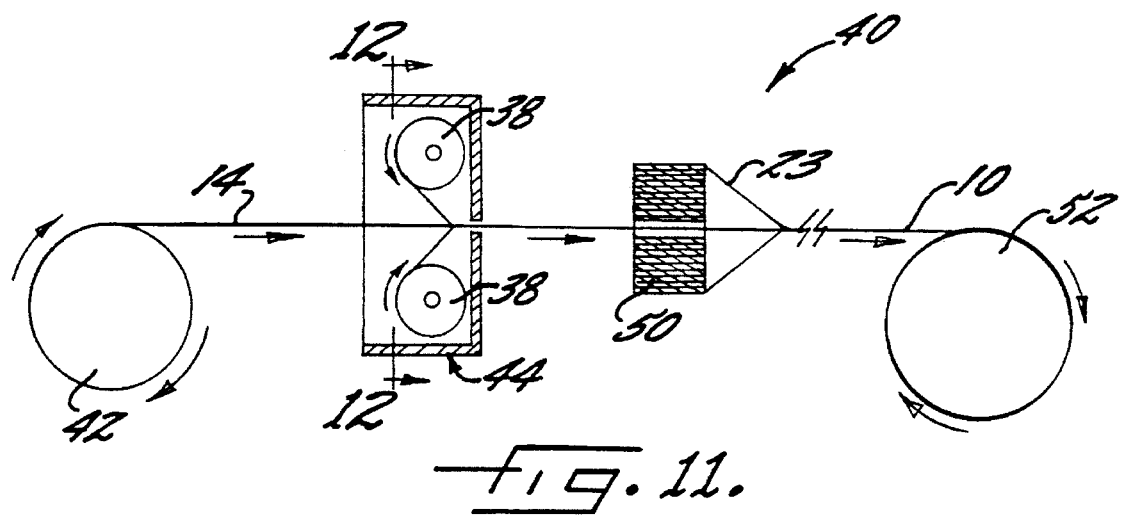
FIG. 11 is a schematic diagram of another apparatus for making a fiber optic cable according to the invention.

An apparatus 40 for fabricating a stranded buffer tube fiber optic cable 10 according to this second aspect of the method is illustrated in FIG. 11. The apparatus includes a supply reel 42 from which the elongate central support member 14 is drawn. The apparatus 40 also includes stranding means for positioning the plurality of buffer tubes 16 about the elongate central support member 14. As illustrated in FIG. 11 and, in more detail, in FIG. 12, the stranding means preferably includes a strander 44 through which the elongate central support member 14 is advanced. The strander 44 rotates about the advancing central support member 14 such that buffer tubes 16 are drawn from buffer tube supply reels 46 mounted on the strander and are stranded about the central support member.

Figure 12:
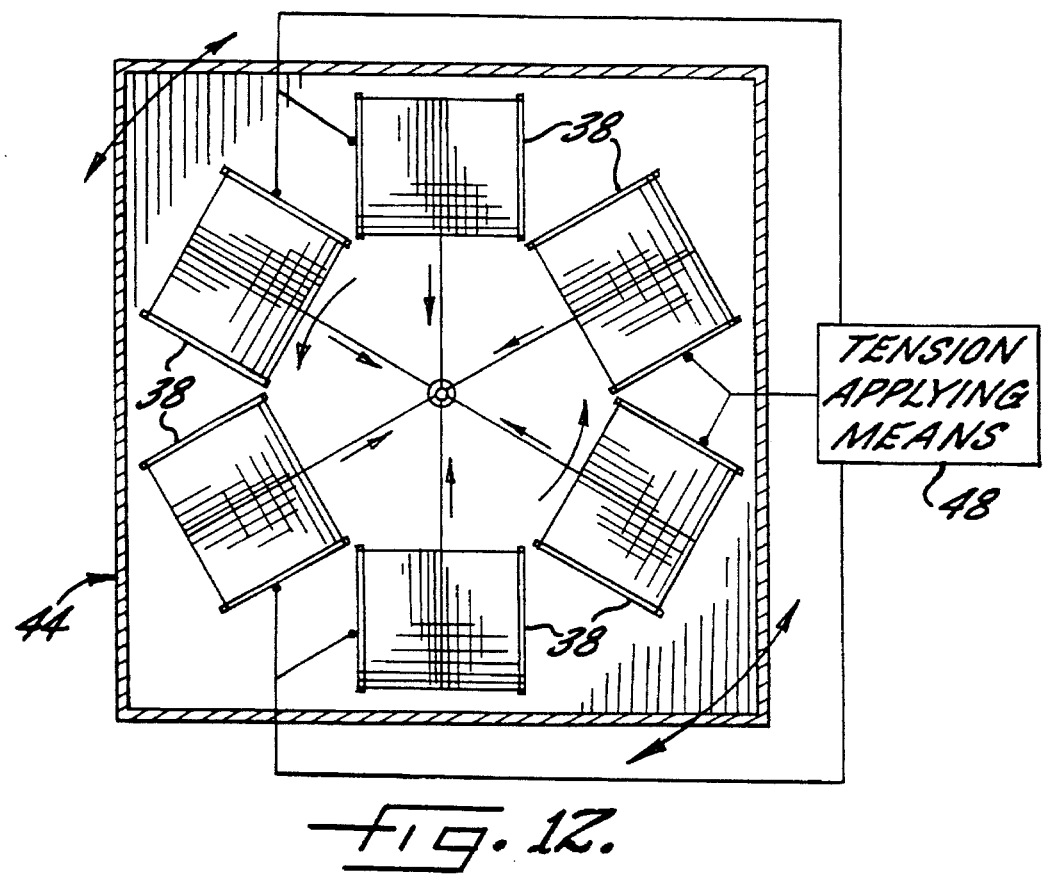
FIG. 12 is a cross-sectional view of the strander for positioning the buffer tubes around a central support member taken along lines 12—12 of FIG. 11.

As best shown in FIG. 12, the strander 44 may include a plurality of supply reels 46 of buffer tubes 16 for stranding about the central support member 14. The buffer tube supply reels 46 are typically the take-up reels 38 on which the buffer tubes 16 are wound as shown in FIG. 10. In the embodiment illustrated, the strander 44 includes six supply reels of buffer tubes 16 and will, accordingly, produce a fiber optic cable 10 having a layer of six buffer tubes 16 positioned circumferentially about the central support member 14 in side-by-side relation. As known to those skilled in the art, the apparatus 40 for fabricating a fiber optic cable 10' according to the invention may also include a second strander, downstream of the first strander 44, for positioning a second layer of buffer tubes 16' about the first layer of buffer tubes and the central support member 14'. Alternatively, the central support member 14 may be passed through a single strander 44 twice to strand both the first and second layers of buffer tubes 16 thereabout.

The strander 44 may be designed to rotate in one direction to position the buffer tubes 16 in a helical lay pattern around the central support member 14. Alternatively, the strander 44 may periodically reverse directions of rotation to position the buffer tubes 16 in a reverse oscillating helical lay pattern around the central support member 14.

As known to those skilled in the art, the buffer tubes may be positioned about the central support member according to a number of stranding methods. For example, the buffer tubes may be positioned about a central support member by a reverse oscillating lay machine, a planetary strander or a tubular strander, such as those manufactured by Ceeco Machinary Manufacturing Limited of Concord, Ontario, Canada or AFA Industries of Garfield, N.J.

The apparatus 40 for fabricating the fiber optic cable 10 according to this second aspect of the method also includes tensioning means 48 for applying tension to the buffer tubes 16 while the buffer tubes 16 are positioned about the central support member 14. Thus, the buffer tubes 16 are elongated such that the optical fiber 20 have an average position offset in a direction extending radially inward from the buffer tube axis 18 towards the central support member 14 at about room temperature, once the buffer tubes are positioned around the central support member. The tensioning means 48 of the apparatus 40 of FIG. 11 is illustrated schematically in FIG. 12. For example, the tensioning means 48 may include control means associated with each buffer tube supply reel 46 for controlling the amount of tension under which the buffer tubes 16 are drawn from the buffer tube supply reels.

The elongation of the buffer tubes, $\epsilon_{BT}$, due to the applied tension, may be calculated as:

$$\epsilon_{BT} = \frac{4F}{\pi E(D_o^2 - D_i^2)} \quad (8)$$

wherein E is Young's Modulus for the material comprising in buffer tube; $D_o$ is the outer diameter of the buffer tube and $D_i$ is the inner diameter of the buffer tube. For example, Young's Modulus for a buffer tube comprised of polybutylene terephthalate is 2180 N/mm² at room temperature.

Downstream of the strander 44, the apparatus 40 for fabricating the fiber optic cable 10 of the present invention preferably includes means 50 for wrapping a binder 23, such as a yarn, about the buffer tubes 16 and the central support member 14 to bind the buffer tubes to the central support member. Although not illustrated, the apparatus 40 for fabricating the fiber optic cable according to the invention may also include means for applying the lengthwise extending strength means, such as a layer of aramid yarn 24, and an armor layer 26 about the plurality of buffer tubes, as known to those skilled in the art. Still further, the apparatus 40 for fabricating the fiber optic cable preferably includes means for extruding a protective jacket 22 in surrounding relation to the armor layer 26, the underlying layer of aramid yarn 24 and the plurality of buffer tubes 16 prior to winding the thus-formed fiber optic cable 10 on a take-up reel 52.

The fiber optic cable 10 according to the present invention provides an extended contraction window for facilitating optical signal transmission with a generally uniform attenuation down to at least a predetermined minimum temperature while maintaining an elongation window which protects the optical fibers from undesirable strain up to at least a predetermined maximum temperature and as the cable is placed under up to at least a predetermined maximum load. By controllably positioning the optical fibers 20 at an average position offset within a buffer tube 16 at about room temperature in order to provide the desired contraction and elongation windows, the channels may, in many instances, be decreased in size while still maintaining sufficient signal transmission performance over a predetermined temperature range. Accordingly, the overall size of the fiber optic cable 10 may be decreased. Alternatively, the number of optical fibers 20 disposed within each channel may be increased while maintaining sufficient signal transmission performance over a predetermined temperature range. Thus, the fiber count of a fiber optic cable 10 of a predetermined size may be increased.

In the drawings and the specification, there has been set forth preferred embodiments of the invention and, although specific terms are employed, the terms are used in a generic and descriptive sense only and not for purpose of limitation, the scope of the invention being set forth in the following claims.

What is claimed is:

1. A fiber optic cable having an extended thermal contraction window, said fiber optic cable comprising:

an elongate central support member;

channel defining means for defining at least one channel extending generally lengthwise adjacent said central support member, said at least one channel defining a channel axis and having a length as measured along the channel axis;

a jacket surrounding said channel defining means and said central support member; and at least one optical fiber positioned within said at least one channel, said at least one optical fiber having a coefficient of thermal expansion less than the respective coefficient of thermal expansion of at least one of said channel defining means, said jacket and said elongate central support, said at least one optical fiber having a length less than the length of said channel defining means as measured along the channel axis once the fiber optic cable is assembled such that said at least one optical fiber has an average position offset in a direction extending generally radially inward from the channel axis toward the central support member at about room temperature to thereby extend the thermal contraction window of said fiber optic cable.

2. The fiber optic cable according to claim 1 wherein said channel defining means includes at least one lengthwise extending buffer tube.

3. A fiber optic cable according to claim 2 wherein said average position offset at about room temperature and an interior diameter of said at least one buffer tube are selected so that said at least one optical fiber has a generally uniform attenuation down to at least a predetermined minimum temperature.

4. A fiber optic cable according to claim 2 wherein said average position offset at about room temperature is in a range of about 1% to 49% of an interior diameter of said at least one buffer tube.

5. A fiber optic cable according to claim 2 wherein said average position offset at about room temperature and an interior diameter of said buffer tube define a spacing between said at least one optical fiber and an adjacent interior portion of said buffer tube to provide a predetermined elongation window for said fiber optic cable.

6. A fiber optic cable having an extended thermal contraction window, said fiber optic cable comprising:

an elongate central support member;

channel defining means for defining at least one channel extending generally lengthwise adjacent said central support member, wherein said at least one channel defining a channel axis; and wherein said channel defining means includes at least one lengthwise extending buffer tube;

a jacket surrounding said channel defining means and said central support member; and at least one optical fiber positioned within said at least one channel, said at least one optical fiber having a coefficient of thermal expansion less than the respective coefficient of thermal expansion of at least one of said channel defining means, said jacket and said elongate central support, said at least one optical fiber having an average position offset in a direction extending generally radially inward from the channel axis toward the central support member at about room temperature to thereby extend the thermal contraction window of said fiber optic cable, wherein said average position offset at about room temperature and an interior diameter of said buffer tube define a spacing between said at least one optical fiber and an adjacent interior portion of said buffer tube to provide a predetermined elongation window for said fiber optic cable, and wherein said average position offset at about room temperature is in a range of about 1% to 49% of the interior diameter of said at least one buffer tube and wherein the interior diameter of said at least one buffer tube is selected so that undesirable strain is not imparted to said at least one optical fiber up to at least a predetermined maximum temperature and as said fiber optic cable is subjected to a tensile load up to at least a predetermined maximum load.

7. A fiber optic cable according to claim 1 wherein said central support member comprises a reinforced dielectric material.

8. A fiber optic cable according to claim 1 wherein said central support member comprises at least one metal wire.

9. A fiber optic cable according to claim 2 wherein each of said buffer tubes has a predetermined circular cross-sectional shape.

10. A fiber optic cable according to claim 2 wherein said at least one buffer tube includes a plurality of buffer tubes positioned circumferentially around said central support member in side-by-side relation.

11. A fiber optic cable according to claim wherein said at least one buffer tube includes a plurality of buffer tubes positioned in at least two layers around said central support member.

12. A fiber optic cable according to claim 2 wherein said at least one buffer tube is positioned about said central support member in a reverse oscillating helical lay pattern.

13. A fiber optic cable according to claim 2 wherein said at least one buffer tube is positioned about said central support member in a helical lay pattern.

14. A fiber optic cable according to claim 1 wherein said channel defining means includes an elongate core surrounding said central support member and defining at least one generally lengthwise extending slot.

15. A fiber optic cable having an extended thermal contraction window, said fiber optic cable comprising:

an elongate central support member;

at least one lengthwise extending filler element adjacent said central support member;

channel defining means for defining at least one channel extending generally lengthwise adjacent said central support member, wherein said at least one channel defining a channel axis, and wherein said channel defining means includes at least one lengthwise extending buffer tube;

a jacket surrounding said channel defining means and said central support member; and at least one optical fiber positioned within said at least one channel, said at least one optical fiber having a coefficient of thermal expansion less than the respective coefficient of thermal expansion of at least one of said channel defining means, said jacket and said elongate central support, said at least one optical fiber having an average position offset in a direction extending generally radially inward from the channel axis toward the central support member at about room temperature to thereby extend the thermal contraction window of said fiber optic cable.

16. A fiber optic cable comprising:

a lengthwise extending central support member;

channel defining means for defining at least one channel extending generally lengthwise adjacent said central support member, said at least one channel defining a channel axis and having a length as measured along the channel axis; and at least one optical fiber positioned within said at least one channel and having a length less than the length of said channel defining means as measured along the channel axis once the fiber optic cable is assembled such that said at least one optical fiber has an average position offset in a direction extending generally radially inward from the channel axis toward said central support member at temperatures in a range of about 20° C. to about 26° C.

17. The fiber optic cable according to claim 16 wherein said channel defining means includes at least one lengthwise extending buffer tube.

18. A fiber optic cable according to claim 17 further comprising a protective jacket surrounding said at least one buffer tube wherein said at least one optical fiber has a coefficient of thermal expansion less than the respective coefficient of thermal expansion for at least one of said at least one buffer tube, said protective jacket and said central support member.

19. A fiber optic cable according to claim 17 wherein said average position offset at about 20° C. to about 26° C. and an interior diameter of said at least one buffer tube are selected to provide a predetermined thermal contraction window for said fiber optic cable so that said at least one optical fiber has a generally uniform attenuation down to a temperature of at least about −40° C.

20. A fiber optic cable according to claim 19 wherein said average position offset at about 20° C. to about 26° C. is in a range of about 1% to 49% of the interior diameter of said at least one buffer tube.

21. A fiber optic cable according to claim 17 wherein said average position offset at about 20° C. to about 26° C. and an interior diameter of said at least one buffer tube define a spacing between said at least one optical fiber and an inner adjacent interior portion of said buffer tube at about 20° C. to about 26° C. to provide a predetermined elongation window for said fiber optic cable.

22. A fiber optic cable comprising:

a lengthwise extending central support member;

channel defining means for defining at least one channel extending generally lengthwise adjacent said central support member, wherein said at least one channel defining a channel axis, and wherein said channel defining means includes at least one lengthwise extending buffer tube; and at least one optical fiber positioned within said at least one channel to have an average position offset in a direction extending generally radially inward from the channel axis toward said central support member at temperatures in a range of about 20° C. to about 26° C., wherein said average position offset at about 20° C. to about 26° C. and an interior diameter of said at least one buffer tube define a spacing between said at least one optical fiber and an inner adjacent interior portion of said buffer tube at about 20° C. to about 26° C. to provide a predetermined elongation window for said fiber optic cable, and wherein said average position offset at about 20° C. to about 26° C. is in a range of about 1% to 49% of the interior diameter of said at least one buffer tube, and wherein the interior diameter of said at least one buffer tube is selected so that undesirable strain is not imparted to said at least one optical fiber up to a temperature of at least about 70° C. and as said fiber optic cable is placed under a tensile load of up to about 600 lbs.

23. A fiber optic cable comprising:

a lengthwise extending central support member;

at least one lengthwise extending filler element adjacent said central support member;

channel defining means for defining at least one channel extending generally lengthwise adjacent said central support member, wherein said at least one channel defining a channel axis, and wherein said channel defining means includes at least one lengthwise extending buffer tube; and at least one optical fiber positioned within said at least one channel to have an average position offset in a direction extending generally radially inward from the channel axis toward said central support member at temperatures in a range of about 20° C. to about 26° C.

24. A fiber optic cable according to claim 16 wherein said channel defining means includes an elongate core surrounding said central support member and defining at least one generally lengthwise extending slot.

25. A fiber optic cable having an extended thermal contraction window, said fiber optic cable comprising:

an elongate central support member;

at least one generally lengthwise extending buffer tube adjacent said central support member, said at least one buffer tube having a predetermined circular cross-section and defining a buffer tube axis, said at least one buffer tube also having a length as measured along the buffer tube axis;

a protective jacket surrounding said at least one buffer tube; and at least one optical fiber positioned within said at least one buffer tube, said at least one optical fiber having a coefficient of thermal expansion less than a respective coefficient of thermal expansion for said at least one buffer tube, said protective jacket and said central support member, said at least one optical fiber having a length less than the length of said at least one buffer tube as measured along the buffer tube axis once the fiber optic cable is assembled such that said at least one optical fiber has an average position offset in a range of about 1% to 49% of an interior diameter of said at least one buffer tube in a direction extending generally radially inward from the buffer tube axis toward the central support member at about room temperature to thereby increase the thermal contraction window of said fiber optic cable, said average position offset at about room temperature and an interior diameter of said at least one buffer tube define a spacing between said at least one optical fiber and an adjacent interior portion of said buffer tube at about room temperature to provide a predetermined elongation window for said fiber optic cable.

26. A fiber optic cable according to claim 25 wherein said average position offset at about room temperature and an interior diameter of said at least one buffer tube are selected so that said at least one optical fiber has a generally uniform attenuation down to a temperature of at least about −40° C.

27. A fiber optic cable according to claim 25 wherein said average position offset at about room temperature and the interior diameter of said at least one buffer tube are selected so that undesirable strain is not imparted to said at least one optical fiber up to a temperature of at least about 70° C. and as said fiber optic cable is placed under a tensile load of up to about 600 lbs.

28. A method of fabricating a fiber optic cable including an elongate central support member and channel defining means for defining at least one channel extending generally lengthwise adjacent the central support member, wherein the at least one channel defines a channel axis, and wherein the channel defining means includes at least one buffer tube, said method comprising the step of positioning at least one optical fiber in at least one channel so that the at least one optical fiber has an average position offset in a direction extending generally radially inward from the channel axis toward the central support member at about room temperature, wherein said optical fiber positioning step includes the step of applying tension to at least one buffer tube to elongate the buffer tube relative to the at least one optical fiber.

29. A method of fabricating a fiber optic cable according to claim 28 further comprising the step of extruding a protective jacket about said at least one buffer tube after said optical fiber positioning step.

30. A method of fabricating a fiber optic cable according to claim 28 wherein the at least one buffer tube includes a plurality of buffer tubes, said method further comprising the step of positioning the plurality of buffer tubes circumferentially around the central support member in side-by-side relation after said optical fiber positioning step.

31. A method of fabricating a fiber optic cable according to claim 28 wherein the at least one buffer tube includes a plurality of buffer tubes, said method further comprising the step of positioning the plurality of buffer tubes in at least two layers around the central support member after said optical fiber positioning step.

32. A method of fabricating a fiber optic cable according to claim 28 further comprising the step of positioning the at least one buffer tube about the central support member in a reverse oscillating helical lay pattern after said optical fiber positioning step.

33. A method of fabricating a fiber optic cable according to claim 28 further comprising the step of positioning the at least one buffer tube about the central support member in a helical lay pattern after said optical fiber positioning step.

34. A method of fabricating a fiber optic cable according to claim 28 further comprising the step of positioning at least one filler element adjacent the central support member after said optical fiber positioning step.

35. A method of fabricating a fiber optic cable including an elongate central support member and channel defining means for defining at least one channel extending generally lengthwise adjacent the central support member, wherein the at least one channel defines a channel axis, said method comprising the step of positioning at least one optical fiber in at least one channel so that the at least one optical fiber has an average position offset in a direction extending generally radially inward from the channel axis toward the central support member at about room temperature, wherein said optical fiber positioning step includes the step of disposing at least one optical fiber within the at least one channel so that a length of the at least one optical fiber is less than the length of the respective channel along the channel axis.

36. A method of fabricating a fiber optic cable according to claim 35 wherein the channel defining means includes at least one buffer tube, and wherein said disposing step includes the step of applying tension to the at least one optical fiber during said disposing step to elastically elongate the at least one optical fiber to the length of the respective buffer tube such that the at least one optical fiber will assume the average position offset once the respective buffer tube has been positioned about the central support member and the tension is relieved.

37. A method of fabricating a fiber optic cable according to claim 35 wherein the channel defining means includes an elongate core surrounding the central support member and defining at least one generally lengthwise extending slot, and wherein said disposing step includes the step of applying tension to the at least one optical fiber during said disposing step to elastically elongate the at least one optical fiber to about the length, measured along the channel axis, of the slot such that the at least one optical fiber will assume the average position offset once the at least one optical fiber has been positioned in the slot and the tension is relieved.

38. A method of fabricating a fiber optic cable according to claim 35 wherein the channel defining means includes at least one buffer tube defining a channel for receiving at least one optical fiber, and wherein said disposing step includes the steps of:

extruding a buffer tube about the at least one optical fiber; and rapidly cooling the extruded buffer tube prior to positioning the buffer tube around the central support member to retard the contraction of the buffer tube such that the at least one optical fiber is elastically elongated relative to the length of the buffer tube.

* * * * *